UNITED STATES PATENT OFFICE.

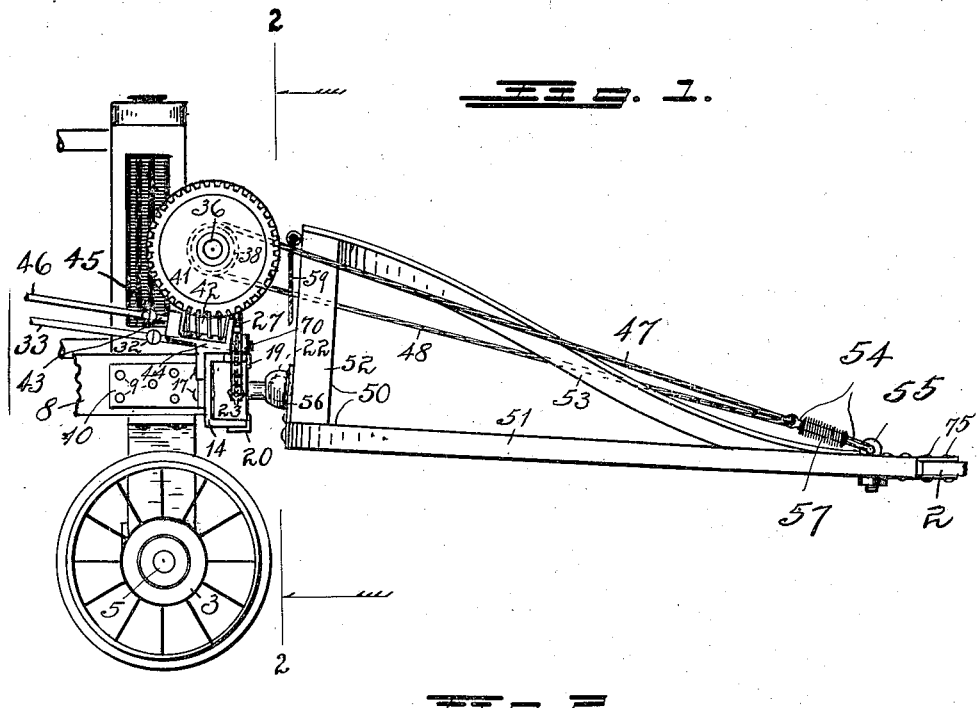

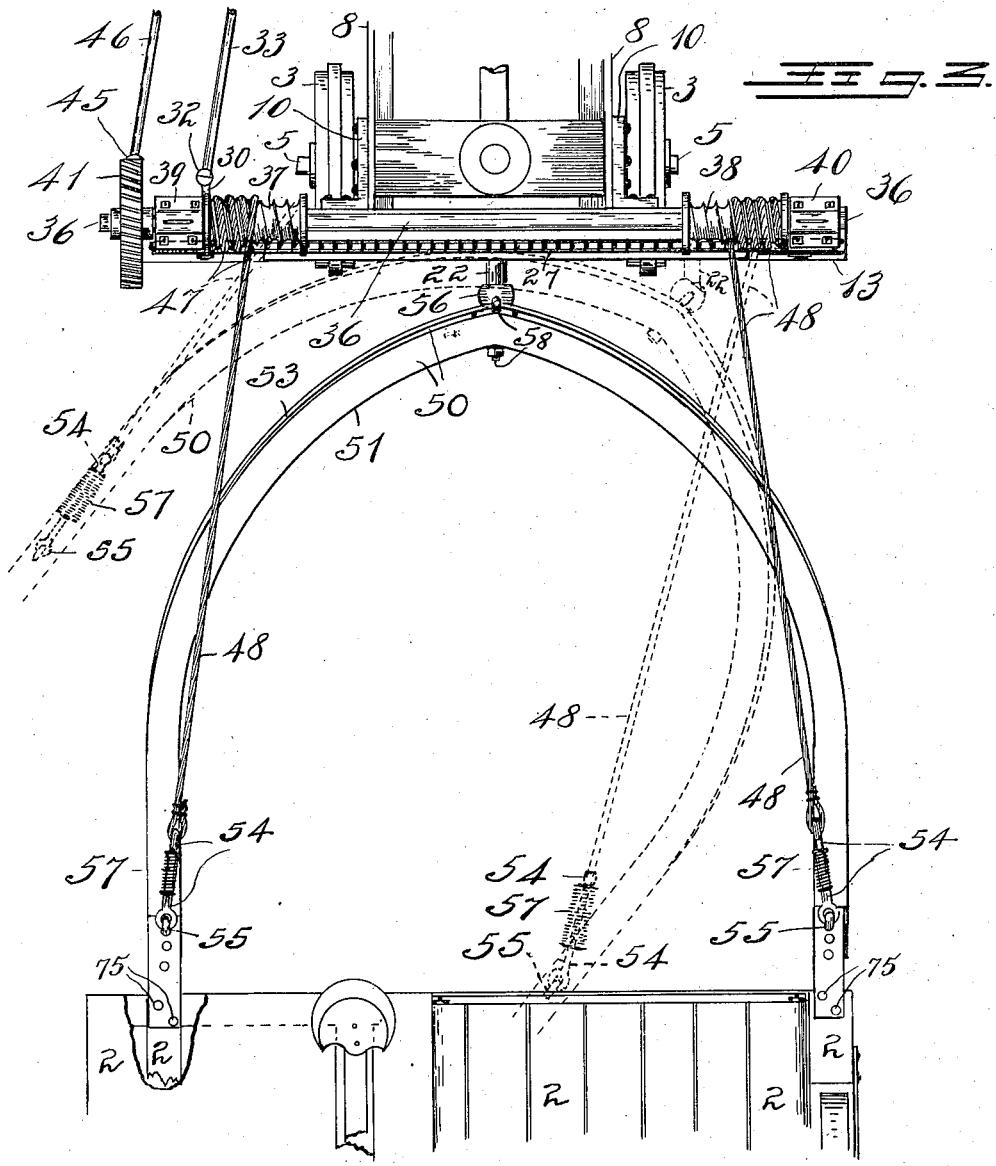

JOHN WILLIAM WISE, OF KNOXVILLE, ILLINOIS.

HITCH FOR TRACTOR-IMPELLED IMPLEMENTS.

1,242,505.      Specification of Letters Patent.      Patented Oct. 9, 1917.

Application filed March 14, 1916. Serial No. 84,160.

*To all whom it may concern:*

Be it known that I, JOHN W. WISE, a citizen of the United States, residing at Knoxville, in the county of Knox and State of Illinois, have invented a new and useful Hitch for Tractor-Impelled Implements, of which the following is a specification.

My invention relates to means for connecting an implement to, and especially before, a tractor, to be driven or pushed thereby. However, as the nature of the invention is more fully disclosed it will be evident that the hitch or connector may be so arranged between the tractor and implement that the latter will be drawn instead of pushed.

The primary object of the invention is to provide novel means for connecting the implement and tractor in such manner that the tool travels in advance of the tractor, thus eliminating the hitherto objectionable feature of having the tractor wheels run over and crush down large quantities of grain, hay, or other crop.

Another object is to provide novel means whereby the implement may be guided by a man riding the tractor, and also be turned sharply at the ends of bouts or at corners.

Other objects will presently appear. Some of these will be obvious and others particularly pointed out.

In the accompanying drawings,

Figure 1 is a side elevation of a hitch or connector, including the operating parts therefor, of a preferred construction of my invention, showing also small portions of a tractor and an implement both of which are engaged by a hitch;

Fig. 2, a vertical transverse section taken in the plane of the line 2—2 in Fig. 1; and Fig. 3, a top plan, showing my improvements as connected to and between a tractor and implement.

Coming now to a detailed description of the drawings and considering the elements and, where necessary, the parts thereof, each by a distinguishing reference numeral, uniformly employed, 2 may be said to designate the rear portion of a binder, rake, tedder, or other implement.

3, 3 designate the pilot wheels and 4, 4 the traction or driving wheels of any suitable self-driven tractor. 5 indicates the front and 6 the rear axle. 7, 7 indicate truss-straps secured to and supporting the side-frame bars 8 of the tractor. Fixed by rivets 9 or the like to each bar 8 is an L-shaped frame-bracket 10.

11, 11 designate bearing-brackets secured at 12 upon the upper horizontally arranged arm 13 of a channel-iron way 14, the web of which is indicated by 15 and the lower arm by 16. 17, 17 indicate rivets whereby the way 14 is rigidly secured to the brackets 10. Suitably secured, as by rivets 18 to the front edge of the arm 13 is a guide-member 19, and similarly secured to the arm 16 is a guide-member 20. These members together with the channel 14 afford a guide in which is slidably mounted a shifting carriage 21 from the central portion of which projects the ball member 22 of a knuckle-joint or hinge presently more fully described. Through each end flange 23 of the shift extends a bolt 24 embraced by a cushion spring 25, the spring being held in place by a nut 26. The respective ends of a sprocket-chain 27 engage the eyes of said bolts 24 and the flight or run of the chain embraces a pair of sprocket wheels 28, 29 fixed on shafts 70, 71 mounted in bearings 30, 31 respectively in the brackets 11. Connected to the shaft 70 by a universal joint 32 is a crank-shaft 33 whereby the wheel 28 may be rotated to thereby drive the chain 27 in either apparent direction, to thereby move the shift 21 to the right or left as desired.

Mounted in bearings 34, 35 in the blocks 11 is a shaft 36 on the outer end portions of which are secured a pair of wormed drums 37, 38.

39, 40 indicate the shaft-box caps. Fixed on one end of the shaft 36 is a worm-wheel 41 which is engaged and driven by a worm 42 fixed on a journal 43 mounted in bearings in a bracket 44 secured to the way 14. Connected to the rear end of the journal 43, by means of a universal joint 45, is a crank-shaft 46 whereby the said instrumentalities may be operated. Wound on the drum 37 is one end of a cable 47, and wound on the drum but in the contrary direction, is a cable 48, the opposite windings permitting either cable to be wound upon its drum while the other is unwound.

50 designates a connector which may be constructed in any suitable manner but which I have shown as in the form of a yoke comprising a substantially U-shaped base 51, a standard 52, and a substantially U-shaped brace or truss-member 53, all suitably connected. Secured to the rear central portion of the base is the socket-member 56 of the universal joint of which the ball 22 comprises the other member. 54, 54 indicate links the front ends of which engage the eyes of eye-bolts 55 secured in the front ends of the base 51. At their rear ends these links are engaged with the front ends of the cables 47, 48. 57, 57 designate compensating or cushion-springs, each embracing the members of one of the links 54.

58 indicates an eye-bolt secured to the rear end and upper portion of the connector 50, and 59 designates a cable secured thereto, its free end adapted to be tied to a portion of the tractor if it be deemed advisable to add means for assisting the cables 47, 48 in holding the connector 50 elevated when an implement is not connected.

The operation: Assume my improvements connected to both a tractor and an implement, and that it is desirable to turn the latter. The operator, standing on the tractor floor will actuate the crank shaft 46 and thereby the worm 42, worm-wheel 41, shaft 36 and worms 37, 38 to cause the selected one of the cables 47 or 48 to swing the front end of the connector 50 to one side and angularly relative to the tractor, which of course may be turned in the usual manner to follow the implement, the swinging movement of the connector being permitted by the universal joint 22, 56. If it be desired to turn a very sharp corner the operator will actuate the crank-shaft 33 and thereby the sprocket-wheel 12 to cause the carriage 21 to move toward either end of the guide or way 14, 19 and 20. Should it be desired to connect the implement so that it is not driven directly in front of the tractor, this may be accomplished by first setting the shift and thereby the connector toward either side of said guide, proper adjustments of the cables being first made. It will be evident that if it be necessary to back up, the connector and implement will be drawn likewise by means of the ball and socket joint. The connector may be attached to the implement in the manner indicated in Fig. 3, namely, by rivets 75, or in any other manner, as desired; and the placement of the implement may be either as shown or between the arms of the yoke.

I fully realize that considerable variation in the construction and organization of the elements entering into my improvements is possible, without departing from the spirit of my invention. Therefore I do not intend to limit myself to the specific form herein shown and described except as pointed out in the following claims, wherein it is my purpose to claim all the novelty inherent in the invention as broadly as is permitted by the state of the art.

Having thus described the nature of my invention I claim as new:

1. The combination with a tractor and an implement, of a yoke-shaped connector, means for securing it to the implement, means for securing it to the tractor including a laterally shiftable carriage carried by the tractor and connected to the said connector, means for reciprocating the carriage, and means for swinging the fore end of the connector in a horizontal arc.

2. The combination with a tractor and an implement, of a connector, means for pivotally connecting it to the tractor, means for attaching the implement to the connector, and means carried by the tractor for shifting the rear end of said connector substantially at a right angle to its line of travel.

3. The combination with a tractor and an implement, of a yoke-shaped connector, means for securing the connector to the implement, sprocket-wheels carried by the tractor, a chain embracing them, a shifting carriage carried by the tractor and movable transversely thereof by said chain, and a jointed connection between the carriage and the connector.

4. The combination with a tractor, and an implement of a yoke pivotally connected to the tractor, means for moving said yoke laterally, means for securing the implement to the yoke, a shaft carried by the tractor, drums fixed thereon, cables wound in contrary directions, one on each of said drums, and means for driving said shaft and thereby said drums in the same direction for swinging said yoke in a horizontal arc.

5. In a device of the nature described, and in combination with a tractor, a channeled way arranged transversely thereof, a carriage reciprocable in said way, a pivot-member carried by said carriage, means for reciprocating the carriage, a connector, and a pivot-member carried by the connector and engaged with the pivot-member above recited.

6. In a device of the nature described, and in combination with a tractor, a channeled way arranged transversely thereof, a carriage reciprocable in said way, a connector, a flexible connection between said carriage and connector, and means for swinging the front end of the connector in a horizontal arc.

7. Combined with a tractor, a way arranged transversely thereof, a carriage reciprocable in said way, means for reciprocating it, a connector, a flexible connection between the carriage and connector, and means for swinging the front end of the connector horizontally.

In testimony whereof I hereunto subscribe my name, at Galesburg, Illinois, this 7th day of March, 1916.

JOHN WILLIAM WISE.